Figure 1:
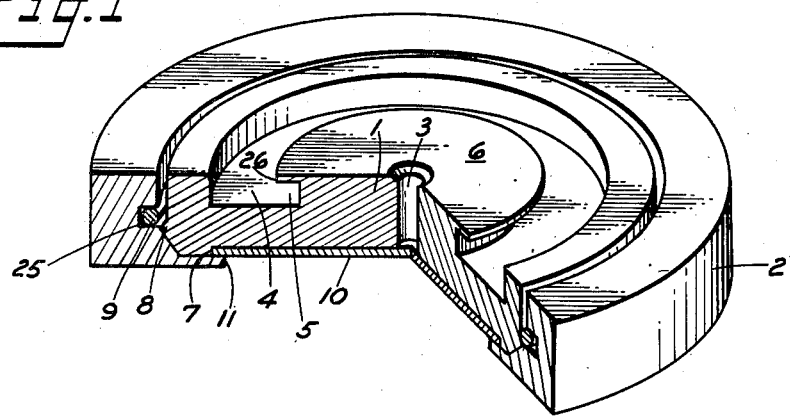

April 23, 1957 W. J. STINSON 2,789,688
SAMPLE HOLDER
Filed May 24, 1950 2 Sheets-Sheet 1

INVENTOR.
William J. Stinson
BY
ATTORNEY

April 23, 1957 W. J. STINSON 2,789,688
SAMPLE HOLDER
Filed May 24, 1950 2 Sheets-Sheet 2

INVENTOR.
William J. Stinson
BY
ATTORNEY

United States Patent Office 2,789,688
Patented Apr. 23, 1957

2,789,688

SAMPLE HOLDER

William J. Stinson, Ballston Spa, N. Y., assignor to the United States of America as represented by the United States Atomic Energy Commission Application May 24, 1950, Serial No. 164,010

4 Claims. (Cl. 206—1)

My invention relates to specimen or sample holders and more particularly to a device for mounting samples of radioactive material for examination and analysis.

One method of analyzing mixtures of elements, or of isotopes, such as the isotopes of uranium to determine the proportion of uranium isotope $U^{235}$, is to bombard a sample of a uranium compound with neutrons from a radium-beryllium source and then measure the ionization produced by the fission fragments resulting from the fission of the uranium isotope $U^{235}$, in some device, such as an ionization chamber or a Geiger Mueller counter. The samples of mixtures or the isotopes in the form of a film of oxide of uranium, such as $U_3O_8$, are carried by thin metallic plates or discs of, for example, nickel, monel, or copper of the order of 3 to 5 mils. thick. The oxide film may be prepared, by electroplating it on the metallic plates, or by the method of Langwill, disclosed in Patent Number 2,486,955, granted November 1, 1949, or by any other suitable method.

The film of uranium oxide, which is extremely fragile, is carefully weighed before the count is made. The thickness of the film is extremely small, generally of the order of 1 micron. Moreover, the film must have either a uniform cross section or a cross section which is completely and easily defined. For these reasons the thin metallic discs must be handled very carefully. In practice they are generally carried by a flat tool such as a spatula, to the place where they are mounted for examination and analysis. In the device for analyzing the samples or specimens, the discs must be held firmly and in substantially the same position with respect to the counting device so that comparable results are obtained in the determination.

In view of the highly radioactive nature of the sample, after being subjected to bombardment and analysis, it is necessary in removing such sample and substituting others, to rapidly carry out the operation while providing a maximum of protection to the operator. This is necessary to safeguard the health of the operator and prevent his overexposure at close range to harmful radiations, while facilitating the rapid examination of samples of waste and/or materials from other sources, to determine the extent of the depletion of any desired isotope or substance.

Applicant with a knowledge of these problems in the prior art has for an object of his invention the provision of a sample holder which may be quickly set up and disassembled with a minimum of handling by the operator.

Applicant has as another object of his invention the provision of a sample holder which may be easily set up and which will accurately position the sample to be examined to insure uniform operating results.

Applicant has as a further object of his invention the provision of a sample holder which may be assembled and disassembled without bringing the operator into intimate relation with the sample or specimen thereof.

Applicant has as a still further object of his invention the provision of a two part holder which may be resiliently engaged and disengaged, and which may, in a single operation, position and mount specimens for examination and analysis.

Other objects and advantages of my invention will appear from the following specification and accompanying drawings and the novel features thereof will be particularly pointed out in the annexed claims.

Figure 3:
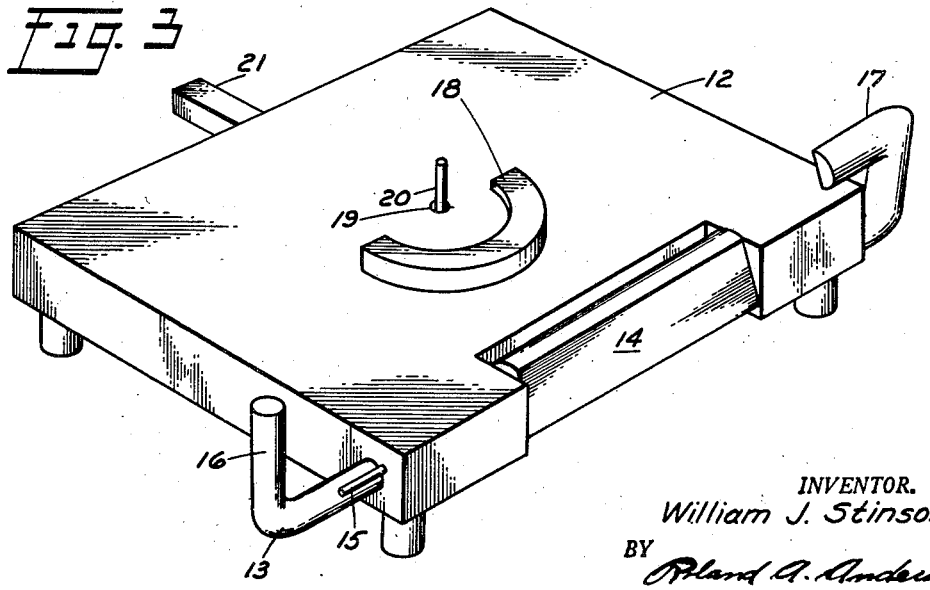
Figure 2:
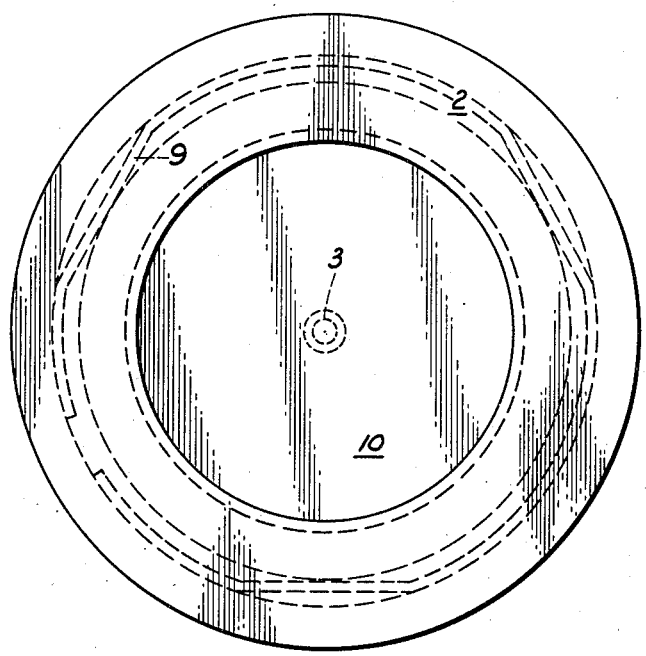

In the drawings, Fig. 1 is an enlarged or exaggerated perspective, partly in section, of my improved holder with a sample therein, viewed from the rear or under face. Fig. 2 is a plan view of the same holder. Fig. 3 is a perspective of the jig for disengaging the holder so that the sample may be removed therefrom.

Generally the holder includes an annular outer member carrying an expansible clip or ring for frictional engagement with the inner circular member as it seats in the annular member, to retain it in place, and the elements of the holder in assembled relation. However, it can best be described by a detailed reference to the accompanying drawings. Referring to the drawings in detail and particularly to Figs. 1 and 2, it is seen that the outer annular member 2 is recessed inwardly from its lower or rear face for the reception of the inner element or base 1, which is disc shaped or of circular configuration. In the wall of the disc receiving recess an annular groove 25 is formed for the reception of an expansible ring or spring clip 9 of any suitable metal. As may be noted in Fig. 2 the clip 9 is generally ring shaped but the curvature is not uniform throughout, since flat portions are provided at spaced intervals of about 120 degrees. These flat portions project out of the groove 25 for engagement with the base 1 at these points. Thus the ring or clip 9 is adapted to coact with a peripheral shoulder 8 on the upper or outer edge of base 1 to retain it in place in the annular member 2. It will be noted that the outer surface of base 1 adjacent shoulder 8 is tapered forwardly to coact with a complementary tapered portion of annular member 2 located next adjacent to lip 11 for positioning the annular member or base 1 when the elements are in assembled relation.

The inner element or base 1 serves to mount the sample, and is generally of flat circular configuration. Formed in an intermediate portion in the under or rear face of the plate 1 is a circular or annular groove 4 having an inner under cut portion 5 which forms an overhanging shoulder 26. This groove is adapted to receive and interlock with an appropriate rib (not shown) on a test slide for insertion into a counting or radiation detecting system, such as that indicated in the co-pending application of Beyer et al., Serial No. 236,632. At the center or axis of the base 1 is a bore 3 which passes through the base from the under to the upper face thereof to provide an opening for the insertion or passage of a tool or probe to disengage the sample discs or plates and remove them, as described more in detail hereinafter, and also may serve to engage a peg or other means on the test slide, referred to above, to anchor the disc thereto in a position so that each sample may be readily located in the same position in the counting device during successive determinations. The upper face of base 1 is recessed to provide a disc retaining socket surrounded by a peripheral shoulder 7, so that in its assembled relation with annular member 2, lip 11 of the annular member is adapted to overhang the socket defined by the shoulder 7 and engage the disc adjacent its edge or rim for maintaining it in position. The sample disc 10 is in the form of a thin metallic sheet of aluminum, monel, magnesium or other suitable material. The radioactive sample may be of uranium oxide or other material spread over the upper surface of the disc in a thin film or layer or electroplated thereon. In the former case this may be accomplished by mixing the oxide with aquadag or other adherent and then spreading it upon the surface of the disc.

In Fig. 3, the jig used in disassembling or assembling the holder comprises essentially a base 12 adapted to be mounted on supports and it carries two suitable levers. One lever 13 may be employed to disengage the annular member 2 from the base 1, and the other lever 21 may be employed for lifting the sample disc 10 from the recess in the plate 1 after the annular member 2 has been removed from the assembly. In one embodiment, the lever means consisted of a sector of a cylinder 14 mounted rigidly on an axle or shaft 15 through the axis of the cylinder segment and carried in bearings in the base 12. The axle or shaft 15 is operated by handle 16 located at one end thereof, and the rotation of the axle or shaft 15 is limited by a stop 17 located at the opposite end thereof. The lever 13 is so fabricated that in one position of the stop 17 the flat face of the cylinder segment 14 is leveled with the surface of the base 12. A minor segment 18 of an annular rib is mounted rigidly on the upper face of the base. The annular sector 18 is smaller than the groove 4 in the under face of the base 1, so it may be inserted therein and its forward overhanging edge may be interlocked with the overhanging wall of the groove 4. Thus it may engage and firmly hold the central island 6 of the plate of the sample mount. An orifice 19 through the base 12 is coaxial with the annular sector 18. The lever means 21 is pivotally suspended on a suitable horiontal axle or shaft (not shown) beneath the base. The lever mounts the pin 20 so that a downward motion of the lever handle moves the pin 20 in a generally upward direction through the orifice 19.

In mounting the sample disc, the central island of the flat plate 1 is placed over sector 18 with some flat tool such as a spatula, and is moved until the overhanging portions of groove 4 and sector 18 are brought into interlocking engagement. In this position the bore 3 of the plate 1 is in alignment with the ejector pin 20. An upward motion of the lever handle 16 may turn the cylindrical segment 14 in a clockwise direction, engaging it with the under face or rim of the anular member 2 and forcing said member generally upwardly, causing the ring 9 to be expanded and forced upwardly over the shoulder 8 disengaging the annular member 2 from plate 1. Immediate contraction of the ring 9 after it passes over the extremity of the shoulder 8 usually causes the annular member to fly up out of the way. After removal of the annular member 2, application of a downward force to the outer end of lever 21, causes it to move about its pivot (not shown), and to project the pin 20 up through the bore 3 in the plate 1, causing the upper end thereof to engage and raise the sample plate 10 out of its recess in the upper face of plate 1. A spatula may then be used to remove the sample disc.

In mounting a sample disc, the same procedure as indicated above is followed in positioning and interlocking the plate 1 of the holder on the jig. The sample disc 10 is then carried by some flat tool or spatula and placed on plate 1 within the socket defined by the peripheral shoulder 7. Thereafter the annular member 2 is placed over the plate 1 and forced downwardly, expanding the resilient ring 9 as it rides out and finally snapping over the shoulder 8. The mating tapered or beveled surfaces on the annular member 2 and base 1 act to properly position these elements with respect to each other. Also the action of clip 9 serves to interlock the base 1 and annular member 2 in tight but yielding engagement, and maintains the elements in assembled relation with the lip 11 of the annular member 2 bearing upon the outer edge or periphery of the sample disc 10 to retain it in place.

Having thus described my invention, I claim:

1. A sample holder of the character described comprising a base having a recess in one face thereof defining a flat supporting portion, a plate for carrying a sample on one surface positioned in said recess to expose said surface, an annular member for receiving the base, said annular member having a portion overhanging the plate to retain it in place, and a clip carried by the annular member for engagement with the base to yieldingly maintain the recited elements in assembled relation.

2. A sample holder of the character described comprising a base having a recess in one face thereof, a plate for carrying a sample on one surface positioned in the recess, an annular member having a portion overhanging the plate to retain it in place, mating tapered portions on the base and annular member for engagement to position them with respect to each other, and a ring clip carried by the annular member for engagement with the base to maintain the recited elements in assembled relation.

3. A sample holder of the character described comprising a base having a recess in one face thereof, a plate for carrying a sample on one surface positioned in the recess, an annular member having a portion overhanging the plate to retain it in place, mating tapered portions on the base and annular member for positioning them with respect to each other, a circular groove in the annular member facing the base for the reception of an expansible clip, and a shoulder formed by one extremity of the tapered portion on said base for engagement by said clip to yieldingly maintain the recited elements in assembled relation.

4. A sample holder of the character described comprising a base having a recess in its upper face for the reception of a sample plate, an annular member for the reception of the base and having an overhanging lip for retaining the sample plate in position, complementary tapered portions on the base and annular member for positioning them with respect to each other, a circular groove in said annular member facing said base, a shoulder on said base, and a ring shaped spring clip having spaced straight portions for engagement with the shoulder to yieldingly maintain the recited elements in assembled relation.

References Cited in the file of this patent

UNITED STATES PATENTS

| | | |
|---|---|---|
| 1,832,469 | Neill et al. | Nov. 17, 1931 |
| 2,210,983 | MacClatchie | Aug. 13, 1940 |
| 2,307,318 | Kinney | Jan. 5, 1943 |
| 2,434,450 | Williford | Jan. 13, 1948 |
| 2,473,373 | Howell | June 14, 1949 |
| 2,525,345 | Getchell | Oct. 10, 1950 |

FOREIGN PATENTS

| | | |
|---|---|---|
| 531,833 | Great Britain | Jan. 13, 1941 |